(12) United States Patent
Kondoh (10) Patent No.: US 8,269,742 B2
(45) Date of Patent: Sep. 18, 2012

(54) MANUFACTURING METHOD OF COORDINATE POSITION DETECTING DEVICE

(75) Inventor: Koichi Kondoh, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 654 days.

(21) Appl. No.: 12/420,203

(22) Filed: Apr. 8, 2009

(65) Prior Publication Data

US 2009/0284493 A1    Nov. 19, 2009

(30) Foreign Application Priority Data

May 19, 2008  (JP) .................................. 2008-130857

(51) Int. Cl.
*G06F 3/045* (2006.01)
*G06F 3/041* (2006.01)
*C03C 15/00* (2006.01)
*C03C 25/68* (2006.01)

(52) U.S. Cl. ............. 345/174; 345/173; 216/94; 216/83

(58) Field of Classification Search .......... 345/173–175; 216/65, 83, 94
See application file for complete search history.

(56) References Cited

U.S. PATENT DOCUMENTS

| 2001/0036504 A1 | 11/2001 | Bottari et al. |
| 2007/0013678 A1 | 1/2007 | Nakajima et al. |

FOREIGN PATENT DOCUMENTS

| CN | 1581370 | 2/2005 |
| JP | 10-83251 A | 3/1998 |
| JP | 2001-125724 A | 5/2001 |
| JP | 2002-323543 | 11/2002 |
| JP | 2007-25904 A | 2/2007 |
| JP | 2007-249260 | 9/2007 |
| KR | 10-2002-0091297 | 12/2002 |
| KR | 10-2008-0043202 | 5/2008 |

OTHER PUBLICATIONS

Office Action dated Jan. 7, 2011 issued with respect to the corresponding Korean Patent Application No. 10-2009-0038932.
Office Action dated Mar. 23, 2011 issued with respect to the corresponding Chinese Patent Application No. 2009 1014 0576.7.

*Primary Examiner* — Srilakshmi K Kumar
(74) *Attorney, Agent, or Firm* — IPUSA, PLLC

(57) ABSTRACT

A manufacturing method of a coordinate position detecting device includes the steps of forming the common electrode on the resistive film of tour sides of the substrate having a rectangular-shaped configuration; measuring the electric potential of the resistive film by plural probes contacting a surface of the resistive film where the electric potential is supplied from the common electrode to the resistive film; calculating a resistive film removing area, based on a value of a measured electric potential, by a calculating part so that the electric potential distribution of the resistive film is made uniform; and removing the resistive film in the resistive film removing area calculated by the calculating part, by a laser light.

5 Claims, 10 Drawing Sheets

MANUFACTURING METHOD OF COORDINATE POSITION DETECTING DEVICE

CROSS-REFERENCE TO RELATED APPLICATIONS

This patent application is based upon and claims the benefit of priority of Japanese Patent Application No. 2008-130857 filed on May 19, 2008, the entire contents of which are incorporated herein by reference.

BACKGROUND OF THE INVENTION

1. Field of the Invention

The present invention generally relates to manufacturing methods of coordinate position detecting devices.

2. Description of the Related Art

A touch panel, for example, has been used as an input device of a computer system. The touch panel is provided on a display and configured to detect a coordinate position on the display and obtain a detection signal corresponding to the coordinate position. A direct input can be performed on the touch panel so that the input can be performed easily and intuitively.

Various types such as a resistive film type, an optical type, and a capacitive coupling type have been suggested for the touch panel. It is a general practice to use the resistive film type having a simple structure and a simple control system for the touch panel. There are 4-wire type, 5-wire type, 8-wire type, and other low resistive touch panels, depending on the arrangement of electrodes on the resistive film.

In the 5-wire type resistive film touch panel compared to the 4-wire type or 8-wire type resistive film touch panel, a conductive film of an upper part board arranged at an operating surface side is exclusively for electric potential reading. Accordingly, the 5-wire type touch panel does not have a problem of an edge sliding, which is one of problems of the 4-wire type or 8-wire type resistive film touch panel. Because of this, the 5-wire type touch panel has been used in hard service conditions or in a case where a long endurance term is demanded.

Figure 1:
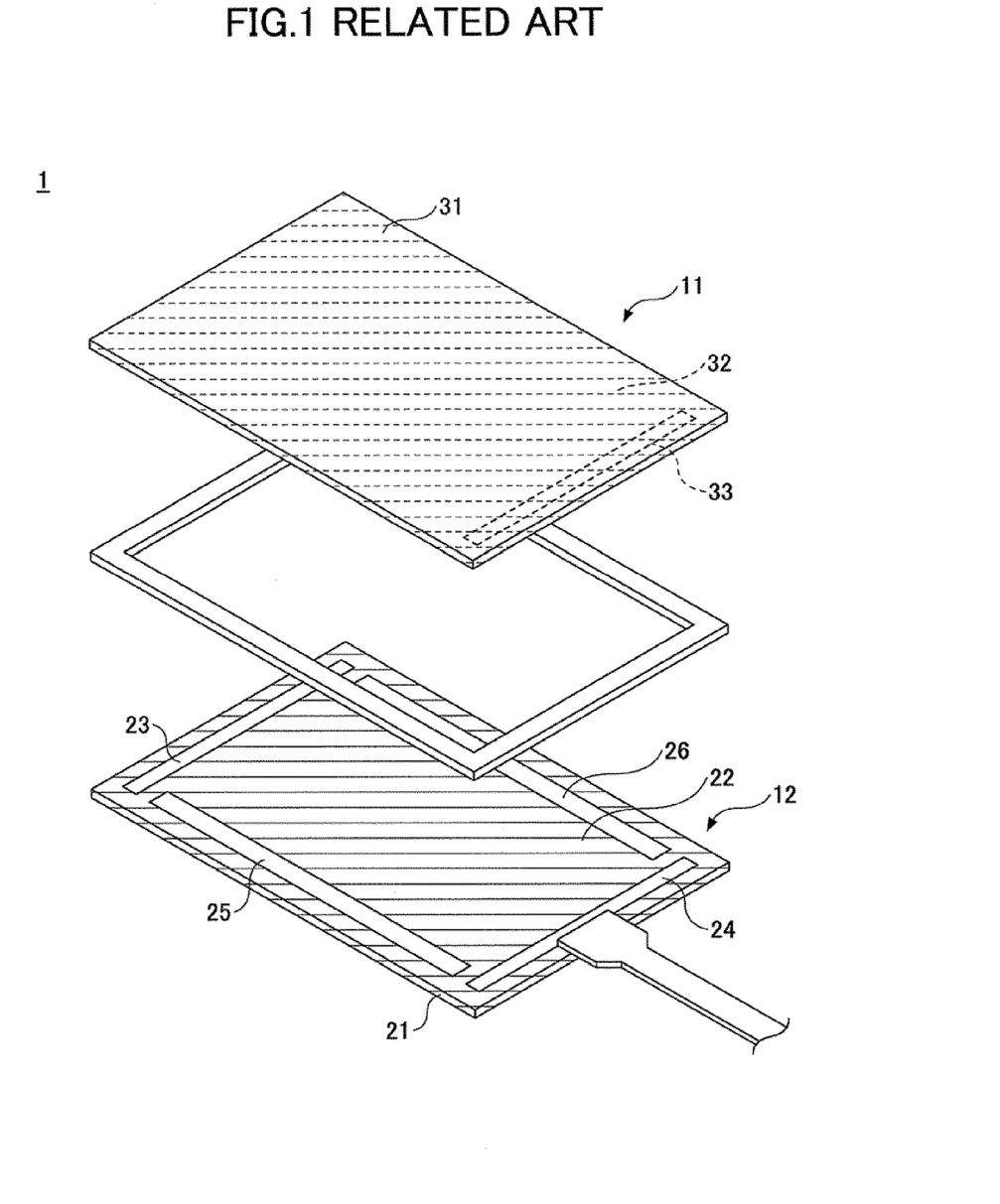
FIG. 1 is a view showing a structure of a 5-wire resistive film touch panel.

FIG. 1 is a view showing a structure of a 5-wire resistive film touch panel.

A 5-wire resistive film touch panel 1 shown in FIG. 1 includes an upper part board 11 and a lower part board 12. A transparent resistive film 22 is formed on the entire surface of a glass substrate 21 of the lower part board 12. X-axis coordinate detection electrodes 23 and 24 and Y-axis coordinate detection electrodes 25 and 26 are formed on the transparent resistive film 22.

A transparent resistive film 32 is formed on a film board 31 of the upper part board 11. A coordinate detection electrode 33 is formed on the transparent resistive film 32.

First, by applying voltages to the X-axis coordinate detection electrodes 23 and 24, an electric potential distribution is generated in an X-axial direction of the transparent resistive film 22 of lower part board 12. At this time, the electric potential of the transparent resistive film 22 of the lower part board 12 is detected so that an X coordinate of a position where the upper part board 11 comes in contact with the lower part board 12 can be detected.

Next, by applying voltages to the Y-axis coordinate detection electrodes 25 and 26, an electric potential distribution is generated in a Y-axial direction of the transparent resistive film 22 of the lower part board 12. At this time, electric potential of the transparent resistive film 22 of lower part board 12 is detected so that a Y coordinate of the position where the upper part board 11 comes in contact with the lower part board 12 can be detected.

In the above-mentioned touch panel, there is a problem in generating the electric potential distribution uniformly on the transparent resistive film 22 of lower part board 12. In order to make the electric potential distribution on the transparent resistive film 22 of lower part board 12 uniform, for example, a method where electric potential distribution correction patterns are provided in the periphery at plural stages is disclosed in Japanese Laid-Open Patent Application No. 10-83251.

In addition, a method where a common electrode is provided so as to surround the perimeter of an input screen is disclosed in Japanese Laid-Open Patent Application No. 2001-125724.

Furthermore, a method where an opening part is provided at an insulation film formed on a transparent resistive film and an electric potential is supplied from the opening part is disclosed in Japanese Laid-Open Patent Application No. 2007-25904.

A coordinate input device has been required to have a narrow frame due to miniaturization of the apparatus where the coordinate input device is provided.

However, in a coordinate input device described in Japanese Laid-Open Patent Application No. 10-83251, it is necessary to provide the electric potential distribution patterns in the periphery at plural states. Hence, it is difficult to make the frame of the coordinate input device narrow.

Furthermore, in the method described in Japanese Laid-Open Patent Application No. 2001-125724 where the common electrode is provided so as to surround the perimeter of the input screen, if the resistance ratio of the transparent resistive film and the pattern resistance is not large, the electric potential distribution of the transparent resistive film is not uniform.

In addition, in the method described in Japanese Laid-Open Patent Application No. 2007-25904 where the opening part is provided at the insulation film, while the above-mentioned two problems may be solved, the manufacturing process may be complex. Hence, due to non-uniformity of a value of resistance of a material or upon manufacturing, the yield of products with good properties may be degraded.

SUMMARY OF THE INVENTION

Accordingly, embodiments of the present invention may provide a novel and useful manufacturing method of a coordinate position detecting device solving one or more of the problems discussed above.

More specifically, the embodiments of the present invention may provide a manufacturing method of a coordinate position detecting device, whereby coordinate position detecting devices having a narrow frame and improved detection precision of a coordinate position can be manufactured with high productivity.

One aspect of the present invention may be to provide a manufacturing method of a coordinate position detecting device, the coordinate position detecting device including
a resistive film formed on a substrate, and
a common electrode configured to apply a voltage to the resistive film,
wherein an electric potential distribution is generated on the resistive film by supplying an electric potential from the common electrode to the resistive film and including an electric potential of a position where the resistive film is contacted, so that a contact position coordinate of the resistive film is detected, the manufacturing method of the coordinate position detecting device including the steps of:

forming the common electrode on the resistive film of four sides of the substrate having a rectangular-shaped configuration;

measuring the electric potential of the resistive film by plural probes contacting a surface of the resistive film where the electric potential is supplied from the common electrode to the resistive film;

calculating a resistive film removing area, based on a value of a measured electric potential, by a calculating part so that the electric potential distribution of the resistive film is made uniform; and removing the resistive film in the resistive film removing area calculated by the calculating part, by a laser light.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 2 through FIG. 10 of embodiments of the present invention.
[Manufacturing Apparatus]

Figure 2:
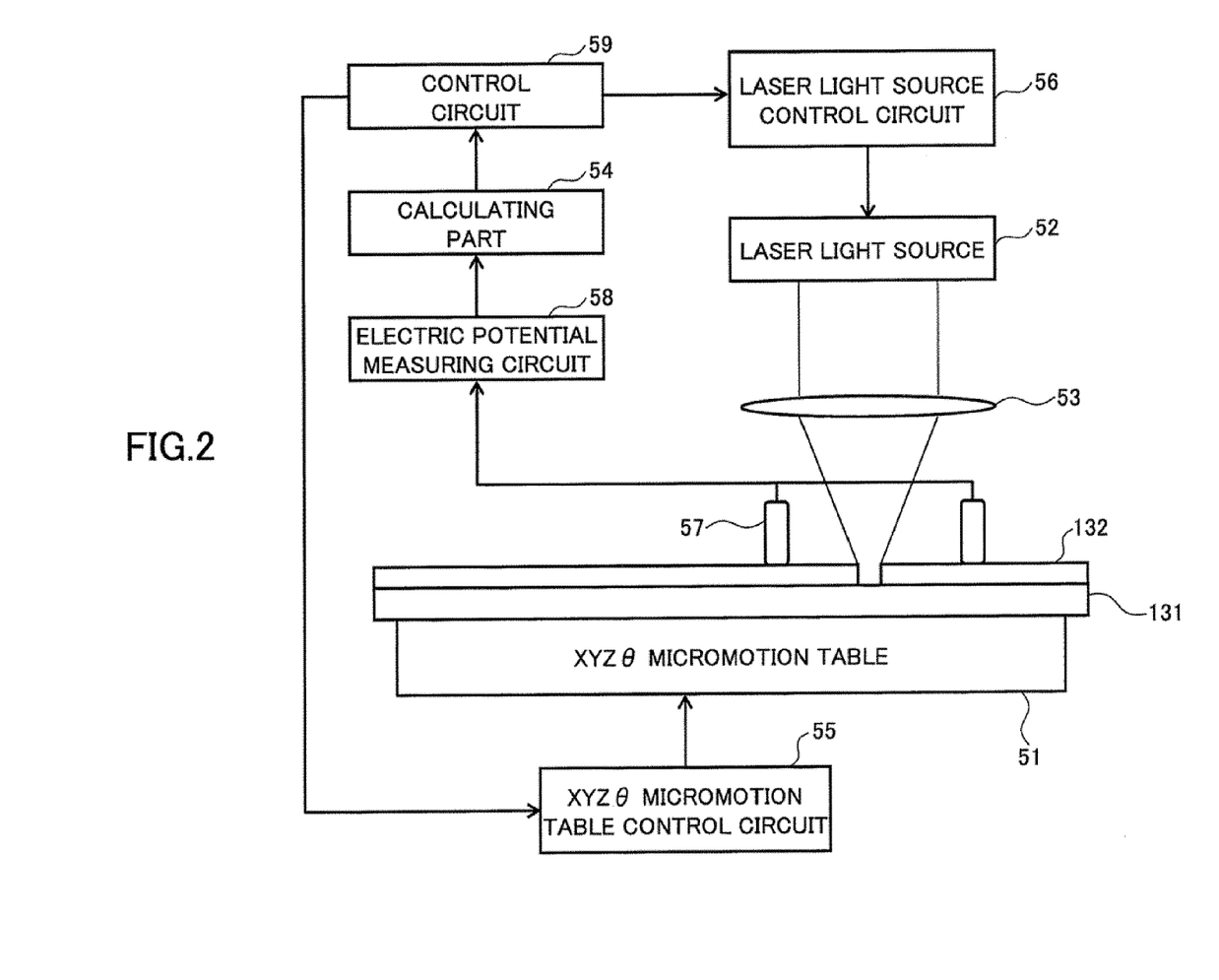
FIG. 2 is a structural diagram of a manufacturing apparatus used for a manufacturing method of a coordinate position detecting device of an embodiment of the present invention.

A manufacturing apparatus used for a manufacturing method of the embodiment of the present invention is discussed in detail with reference to FIG. 2. Here, FIG. 2 is a structural diagram of the manufacturing apparatus.

The manufacturing apparatus of the embodiment of the present invention includes an XYZ θ micromotion table 51, an XYZ θ micromotion table control circuit 55, a laser light source 52, a laser light source control circuit 56, an optical system 53, a probe 57, an electric potential measuring circuit 58, a calculating part 54, a control part 59, and others.

The XYZ θ micromotion table 51 is a moving table whereby a glass substrate 131 can be moved in an X direction, a Y direction, a Z direction and a θ direction. The XYZ θ micromotion table control circuit 55 is configured to control the XYZ θ micromotion table 51.

The laser light source control circuit 56 is configured to control emission of the laser light source 52. The optical system 53 is configured to condense the light from the laser light source 52 onto a transparent resistive film 132 made of ITO (Indium Tin Oxide)) or the like. The transparent resistive film 132 is formed on the glass substrate 131.

The probe 57 is configured to measure electric potential of a surface of the transparent resistive film 132. The electric potential measuring circuit 58 is configured to measure the electric potential based on a signal from the probe 57. The calculating part 74 is configured to calculate an area of a resistive film removing area discussed below based on the electric potential measured by the electric potential measuring circuit 58.

The control circuit 59 is configured to control the XYZ θ micromotion table control circuit 55 and the laser light source control circuit 56 so that, based on information from the calculating part 54, the laser light from the laser light source 52 is irradiated with a designated timing while the glass substrate 131 is moved by the XYZ θ micromotion table 51.

In the manufacturing apparatus having the above-discussed structure, while the glass substrate 131 is moved by the XYZ θ micromotion table 51, the laser light is irradiated from the laser light source 52 onto a designated area of the transparent resistive film 132 formed on the glass substrate 131 mounted on the XYZ θ micromotion table 51.

This laser light is an excimer laser and has a wavelength of approximately 355 nm. While the light having the above-mentioned wavelength is transmitted through the glass substrate 131, the transparent resistive film 132 has a low transmittance for the light having the above-mentioned wavelength. Accordingly, in an area where this laser light is irradiated, the laser light is transmitted through the glass substrate 131 and is absorbed at the transparent resistive film 132 having the low transmittance.

Because of this, by the irradiation of the laser light, the transparent resistive film 132 in the area where the light is irradiated is removed from the surface of the glass substrate 131 due to ablation. In this embodiment, the transparent resistive film 132 is removed by a laser light having a wavelength of approximately 355 nm.

Thus, the transparent resistive film 132 formed in the designated area of on the glass substrate 131 is removed. More specifically, the area of the transparent resistive film 132 to be removed is calculated by the calculating part 54 based on information of electric potential of the transparent resistive film 132 measured by the electric potential measuring circuit 58 via the probe 57 coming in contact with the transparent resistive film 132.

Because of this, plural probes 57 coming in contact with the transparent resistive film 132 are provided. More specifically, 20 or more probes 57 are arranged two-dimensionally.

The information of the area of the transparent resistive film 132 to be removed, calculated by the calculating part 54, is transmitted to the control circuit 59. Each control information item is transmitted from the control circuit 59 to the XYZ θ micromotion table control circuit 55 and the laser light source control circuit 56. More specifically, the information is transmitted so that the laser light is irradiated from the laser light source 52 while the glass substrate 131 is moved by the XYZ θ micromotion table 51 corresponding to the removed area of the transparent resistive film 132.

[Manufacturing Method]

Figure 3:
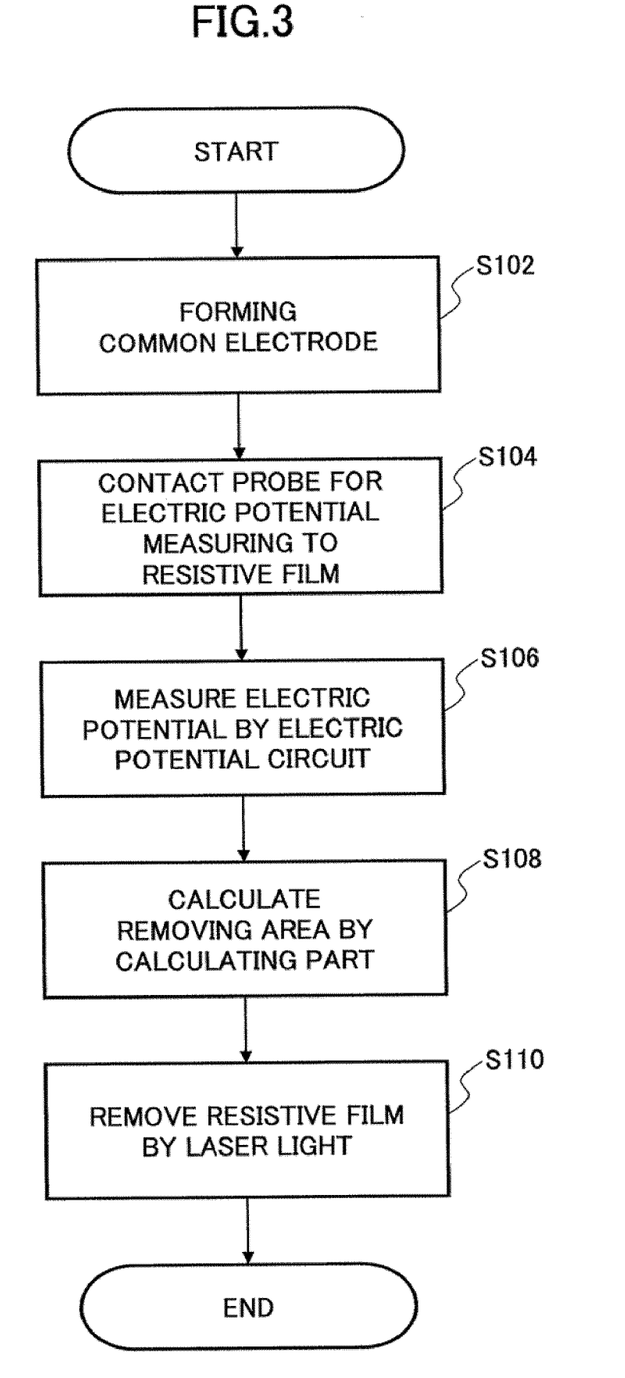
FIG. 3 is a flow chart of the manufacturing method of the coordinate position detecting device of the embodiment of the present invention.
Figure 4:
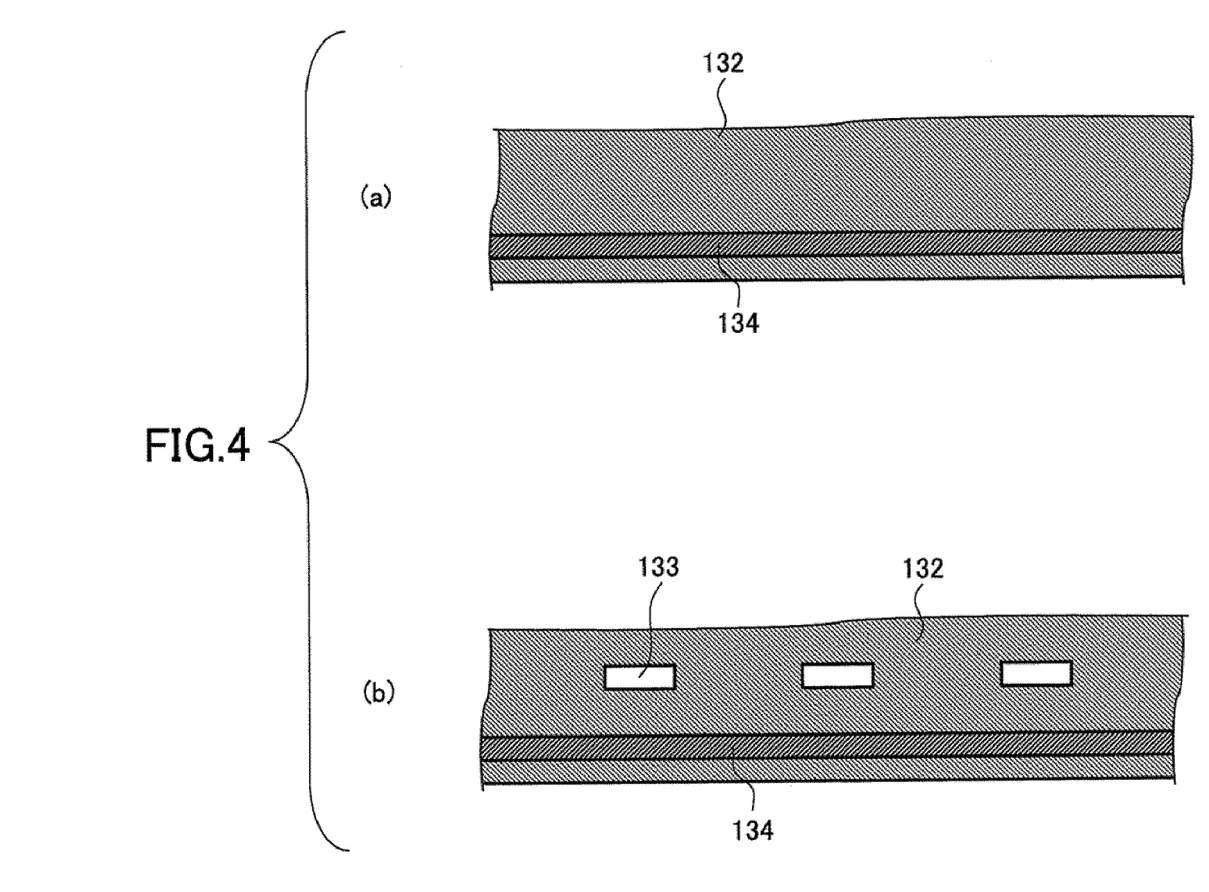
FIG. 4 is a top view of a resistive film removing area formed by the manufacturing method of the coordinate position detecting device of the embodiment of the present invention.

Next, a manufacturing method of the coordinate position detecting device of the embodiment of the present invention is discussed with reference to FIG. 3, FIG. 4, and FIG. 6. Here, FIG. 3 is a flow chart of the manufacturing method of the coordinate position detecting device of the embodiment of the present invention. FIG. 4 is a top view of the resistive film removing area formed by the manufacturing method of the coordinate position detecting device of the embodiment of the present invention. FIG. 6 is a view showing a structure of a panel part. More specifically, this embodiment is related to a manufacturing method of a lower part board 121 (See FIG. 5).

First, a common electrode 134 is formed on the transparent resistive film 132 formed on the glass substrate 131 in step S102 of FIG. 3. The common electrode 134 is made of Ag—C. The transparent resistive film 132 made of, for example, ITO (Indium Tin Oxide)), is formed on the glass substrate 131 by sputtering, vacuum deposition, or the like. More specifically, the common electrode 134 is formed by screen printing a paste containing Ag—C and baking. FIG. 4(a) is a top view of a state where the common electrode 134 is formed.

Next, the probe 57 configured to measure the electric potential is made to come in contact with the surface of the transparent resistive film 132 in step S104 of FIG. 3.

Then, the electric potential of the transparent resistive film 132 is measured by the electric potential measuring circuit 58 via the probe 57 in step S106 of FIG. 3. Because of this, it is possible to determine the status of the electric potential distribution of the transparent resistive film 132. In order to determine this electric potential distribution, the electric potential is supplied by the common electrode 134.

Next, in step S108 of FIG. 3, the removing area of the transparent resistive film 132 is calculated by the calculating part 54 based on information obtained by the electric potential measuring circuit 58. More specifically, in a case where electric potential distribution in theory is not consistent with electric potential distribution measured in step S106, a pitch, configuration, or the like of the resistive film removing area 133 is calculated in the calculating part 54 so that the electric potential distribution is close to the electric potential distribution in theory.

In this case, if the electric potential distribution measured in step S106 is higher than the electric potential distribution in theory, the resistive film removing area 133 is formed wide. If the electric potential distribution measured in step S106 is substantially same as the electric potential distribution in theory, a small resistive film removing area 133 is formed in that part or the resistive film removing area 133 is not formed.

Next, in step S110 of FIG. 3, while the glass substrate 131 is moved by the XYZ θ micromotion table 51, the laser light is irradiated from the laser light source 52 so that part of the transparent resistive film 132 is removed. As a result of this, the resistive film removing areas 133 are formed.

More specifically, based on the information transmitted from the control circuit 59 to the XYZ θ micromotion table control circuit 55 and the laser light source control circuit 56, the laser light source 52 and the XYZ θ micromotion table 51 are controlled so that part of the transparent resistive film 132 is removed to form the resistive film removing areas 133. FIG. 4(b) is a top view of the formed resistive film removing areas 133.

Thus, a forming step of the resistive film removing areas 133 of the embodiment of the present invention is completed.

After this, a first insulation film 135 having a first piercing hole 151-1 through a fourth piercing hole 151-4 is formed (see FIG. 6). More specifically, after a pattern printing is performed by screen printing using insulation paste, baking is performed.

Next, a first wiring 136-1 through a fourth wiring 136-4 made of Ag are formed on the first insulation film 135. More specifically, after a conductive paste containing Ag is pattern printed by the screen printing method, baking is performed so that the first wiring 136-1 through the fourth wiring 136-4 are formed.

Next, a second insulation film 137 is formed. More specifically, after insulation paste is pattern printed by the screen printing method, baking is performed so that the second insulation film 137 is formed.

Thus, the lower part board 121 can be formed.

[Coordinate Position Detecting Device]

Next, a coordinate position detecting device manufactured by the manufacturing apparatus of the embodiment of the present invention is discussed. More specifically, the lower part board 121 is manufactured by the manufacturing apparatus of the embodiment of the present invention.

(System Structure)

Figure 5:
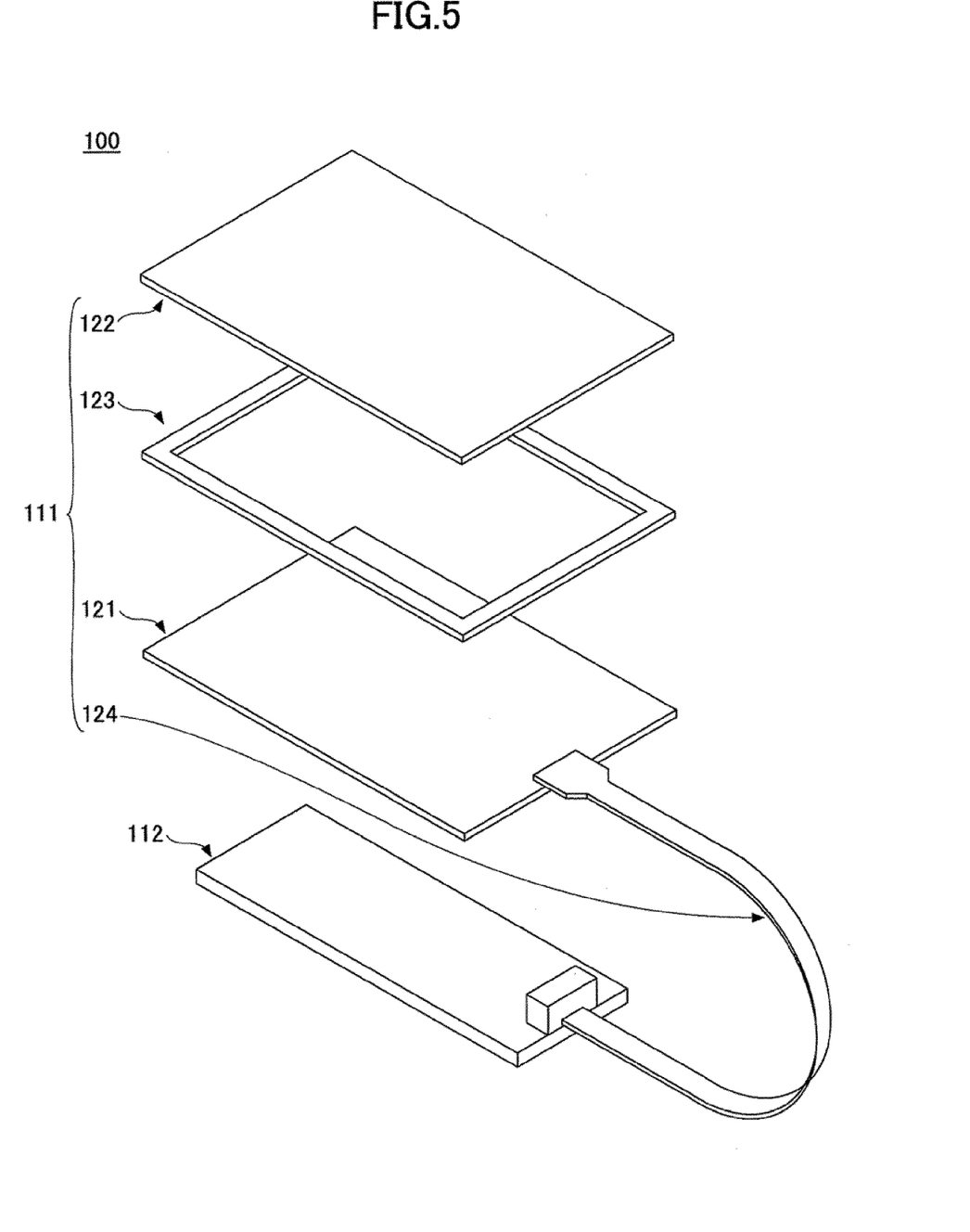
FIG. 5 is a system structural view of the coordinate position detecting device manufactured by the manufacturing method of the embodiment of the present invention.
Figure 6:
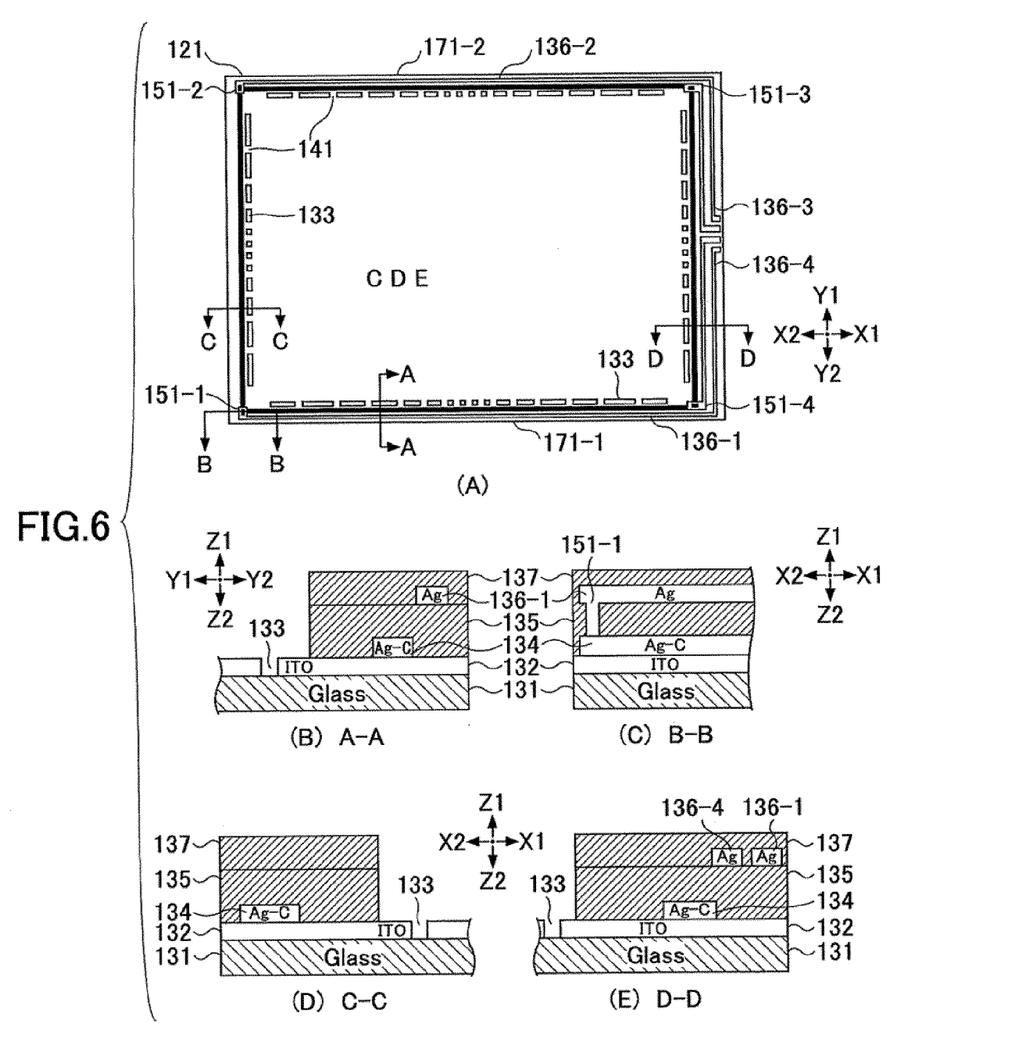
FIG. 6 is a view showing a structure of a panel part.

FIG. 5 is a system structural view of the coordinate position detecting device manufactured by the manufacturing method of the embodiment of the present invention.

In this embodiment, a so-called 5-wire type analog resistive film touch panel is discussed as a coordinate input system 100. The coordinate input system 100 of this embodiment includes a panel part 111 and an interface board 112.

The panel part 111 includes the lower part board 121, the upper part board 122, a spacer 123, and an FPC cable 124. The lower part board 121 and the upper part board 122 are adhered to each other via the spacer 123. The spacer 123 is formed by an insulation double sided tape or the like. The spacer 123 is configured to adhere the lower part board 121 and the upper part board 122 to each other while forming a designated gap between the lower part board 121 and the upper part board 122.

The FPC cable 124 has a structure where the first wiring through the fifth wiring are formed on a flexible printed board. The FPC cable 124 is connected to the lower part board 121 by, for example, thermally compressing an anisotropic conductive film.

(Lower Part Board 121)

Next, a structure of the lower part board 121 is discussed with reference to FIG. 6. FIG. 6(A) is a plan view of the lower part board 121. FIG. 6(B) is a cross-sectional view taken along a line A-A of FIG. 6(A). FIG. 6(C) is a cross-sectional view taken along a line B-B of FIG. 6(A). FIG. 6(D) is a cross-sectional view taken along a line C-C of FIG. 6(A). FIG. 6E is a cross-sectional view taken along a line D-D of FIG. 6(A).

As shown in FIG. 6, the lower part board 121 includes the glass substrate 131, the transparent resistive film 132, the resistive film removing areas 133, the common electrode 134, the first insulating film 135, the wirings 136, and the second insulation film 137.

The transparent resistive film 132 is formed on the entire surface of the glass substrate 131. The transparent resistive film 132 is formed of, for example, ITO (transparent resistive film 132 is formed) by using vacuum deposition or the like. A visible light may be transmitted through the transparent resistive film 132, which has a designated resistance.

(Resistive Film Removing Areas 133)

The resistive film removing areas 133 are provided at a peripheral edge part of the glass substrate 131 and inside an area where the common electrode 134 is formed.

Figure 7:
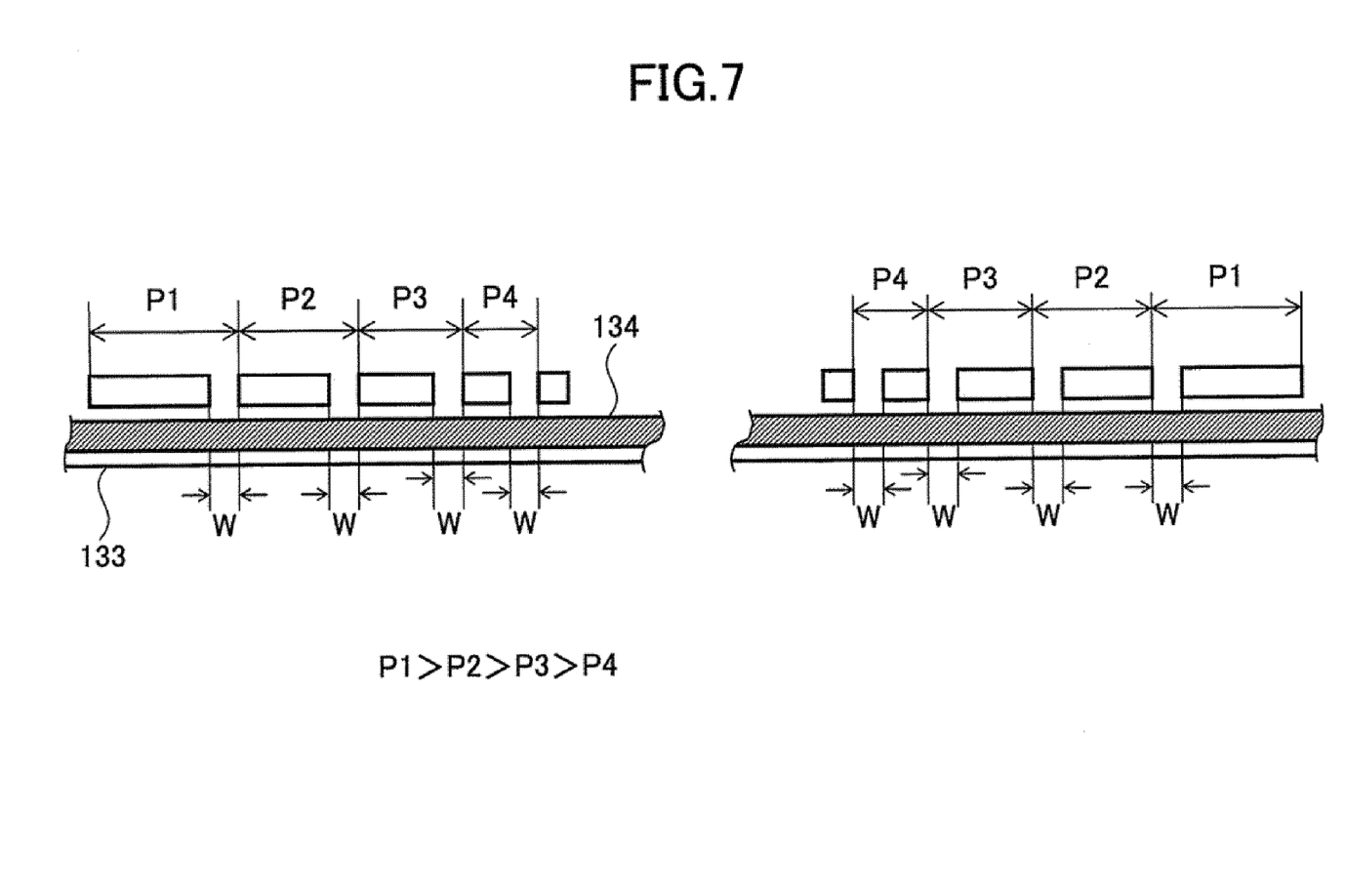
FIG. 7 is a main part plan view of the resistive film removing area.

FIG. 7 is a main part plan view of the resistive film removing areas 133. In this embodiment, as shown in FIG. 7, gaps W between neighboring resistive film removing areas 133, namely widths of areas for supplying electric potential formed between the neighboring resistive film removing areas 133, are the same as each other.

The pitch of the resistive film removing areas 133 is wide in the peripheries of two ends of the first side 171-1, the second side 171-2, the third side 171-3, and the fourth side 171-4 of the panel part 121. The pitch becomes narrower as it is closer to the center part. More specifically, the pitches P1, P2, P3, P4, ... of the resistive film removing areas 133 are formed from both ends to the center part satisfying the following relationship.

P1>P2>P3>P4 ...

(Area for Supplying Electric Potential)

Areas for supplying the electric potential are parts of the transparent resistive film 132 between the neighboring resistive film removing areas 133. The electric potential is supplied to the entirety of the transparent resistive film 132 via these areas. More specifically, in this embodiment, as shown in FIG. 7, in the peripheries of two ends of the first side 171-1, the second side 171-2, the third side 171-3, and the fourth side 171-4 of the panel part 121, the areas for supplying the electric potential are formed with a wide pitch and the center parts are formed with a narrow pitch.

Under this structure, deformation of the electric potential distribution of the first side 171-1, the second side 171-2, the third side 171-3, and the fourth side 171-4 where the electric potential distribution is large and may be deformed, is reduced. As a result of this, the electric potential distribution of the transparent resistive film 132 can be made uniform and thereby it is possible to perform secure coordinate position detection.

The configuration of the resistive film removing areas 133 is not limited to that shown in FIG. 7. As long as the distribution of the electric potential at the transparent resistive film 132 is made uniform, any configuration may be used.

(Common Electrode 134)

The common electrode 134 is made of, for example, Ag—C. The common electrode 134 is formed on the transparent resistive film 132 outside the resistive film removing areas 133.

(First Insulation Film 135)

The first insulation film 135 is stacked on the transparent resistive film 132 so as to cover the common electrode 134. The first piercing hole 151-1 through the fourth piercing hole 151-4 are formed in the first insulation film 135 at corresponding four corners of the lower part board 121. The first piercing hole 151-1 through the fourth piercing hole 151-4 form a driving voltage applying part.

(First Wiring 136-1 Through Fourth Wiring 136-4)

The first wiring 136-1 is made of, for example, a low resistive material such as Ag. The first wiring 136-1 is formed on the first insulation film 135 along a first side 171-1 of the lower part board 121. The first wiring 136-1 is formed so as to be embedded in the first piercing hole 151-1 formed in the first insulation film 135. The first wiring 136-1 is connected to the first wiring of the FPC cable.

The second wiring 136-2 is made of, for example, a low resistive material such as Ag. The second wiring 136-2 is formed on the first insulation film 135 along a second side 171-2 facing the first side 171-1 of the lower part board 121. The second wiring 136-2 is formed so as to be embedded in the second piercing hole 151-2 formed in the first insulation film 135. The second wiring 136-2 is connected to the second wiring of the FPC cable.

The third wiring 136-3 is made of, for example, a low resistive material such as Ag. The third wiring 136-3 is formed on the first insulation film 135 along a half of a third side 171-3 at the second side 171-2 side of the lower part board 121. The third side 151-3 is perpendicular to the first side 171-1 and the second side 171-2. The third wiring 136-3 is formed so as to be embedded in the third piercing hole 151-3 formed in the first insulation film 135. The third wiring 136-3 is connected to the third wiring of the FPC cable.

The fourth wiring 136-4 is made of, for example, a low resistive material such as Ag. The third wiring 136-3 is formed on the first insulation film 135 along a half of the third side 171-3 at the first side 171-1 side of the lower part board 121. The third side 151-3 is perpendicular to the first side 171-1 and the second side 171-2. The fourth wiring 136-4 is formed so as to be embedded in the fourth piercing hole 151-4 formed in the first insulation film 135. The fourth wiring 136-4 is connected to the third wiring of the FPC cable.

The second insulation film 137 is formed on the first insulation film 135 so as to cover the first wiring 136-1, the second wiring 136-2, the third wiring 136-3, and the fourth wiring 136-4. The upper board 122 is adhered to the upper part of the second insulation film 137 via the spacer 123.

(Upper Part Board 122)

Figure 8:
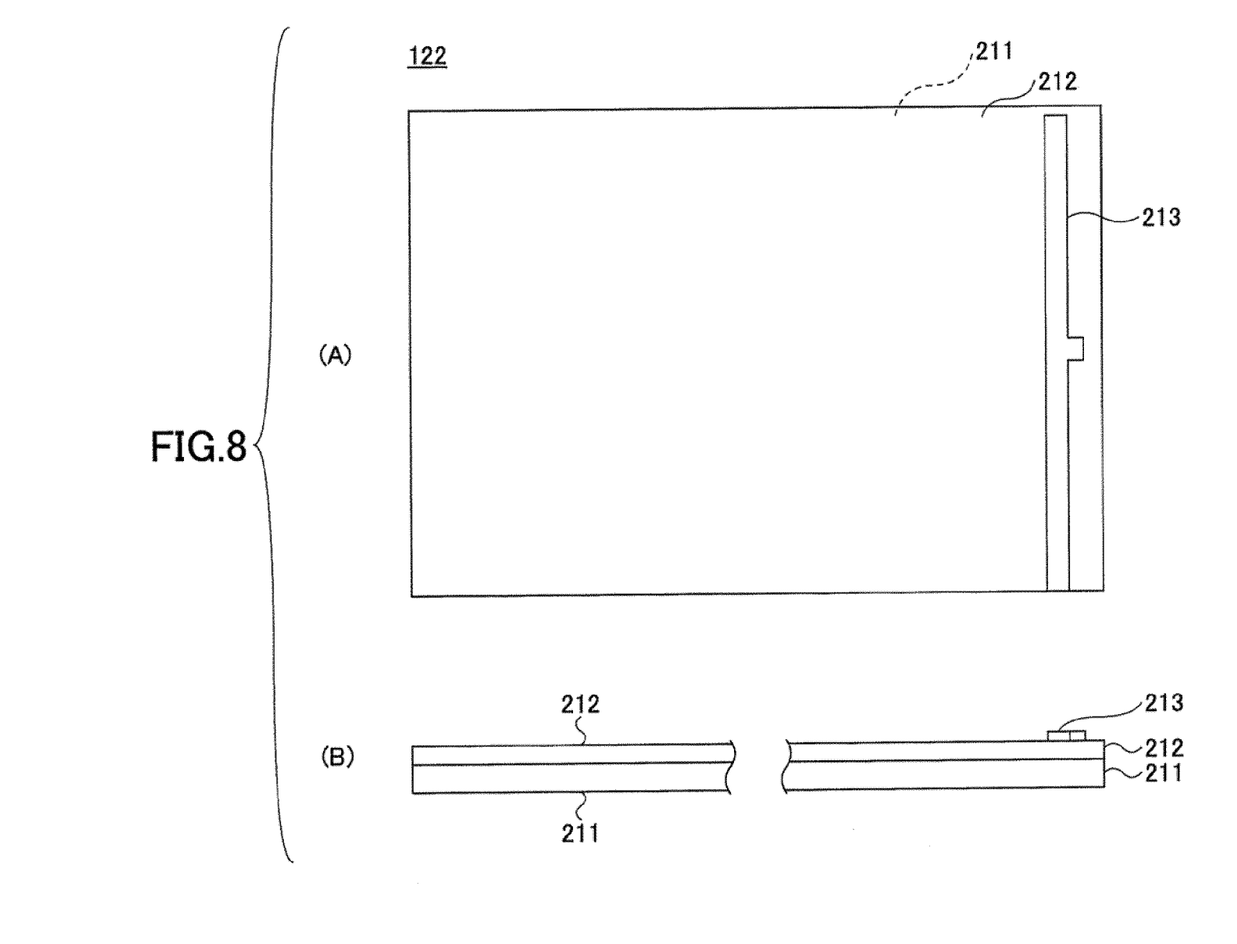
FIG. 8 is a view showing a structure of an upper part board.

Next, a structure of the upper part board 122 is discussed with reference to FIG. 8. Here, FIG. 8(A) is a top view of the upper part board 122. FIG. 8(B) is a cross-sectional view of the upper part board 122.

The upper board 122 includes a film substrate 211, a transparent resistive film 212, an electrode 213, and others. The film substrate 211 is made of a resin film having flexibility such as PET. The transparent resistive film 212 is formed on the entire surface of the film substrate 211 facing the lower part board 121. The transparent resistive film 212 is made of a transparent conductive material such as ITO.

The electrode 213 is arranged at an end part in an X1 direction on the transparent resistive film 212 of the upper board 122. The electrode 213 is connected to a fifth wiring of the FPC cable connected to the lower part board 121 via the contact (not shown). The electric potential of the lower part board 121 is detected by the interface board 112 where the upper part board 122 works as a probe so that the coordinate position is detected.

(Detecting Step)

Next, a step or detecting coordinate positions in the coordinate position detecting device of the embodiment of the present invention is discussed with reference to FIG. 9 and FIG. 10.

Figure 9:
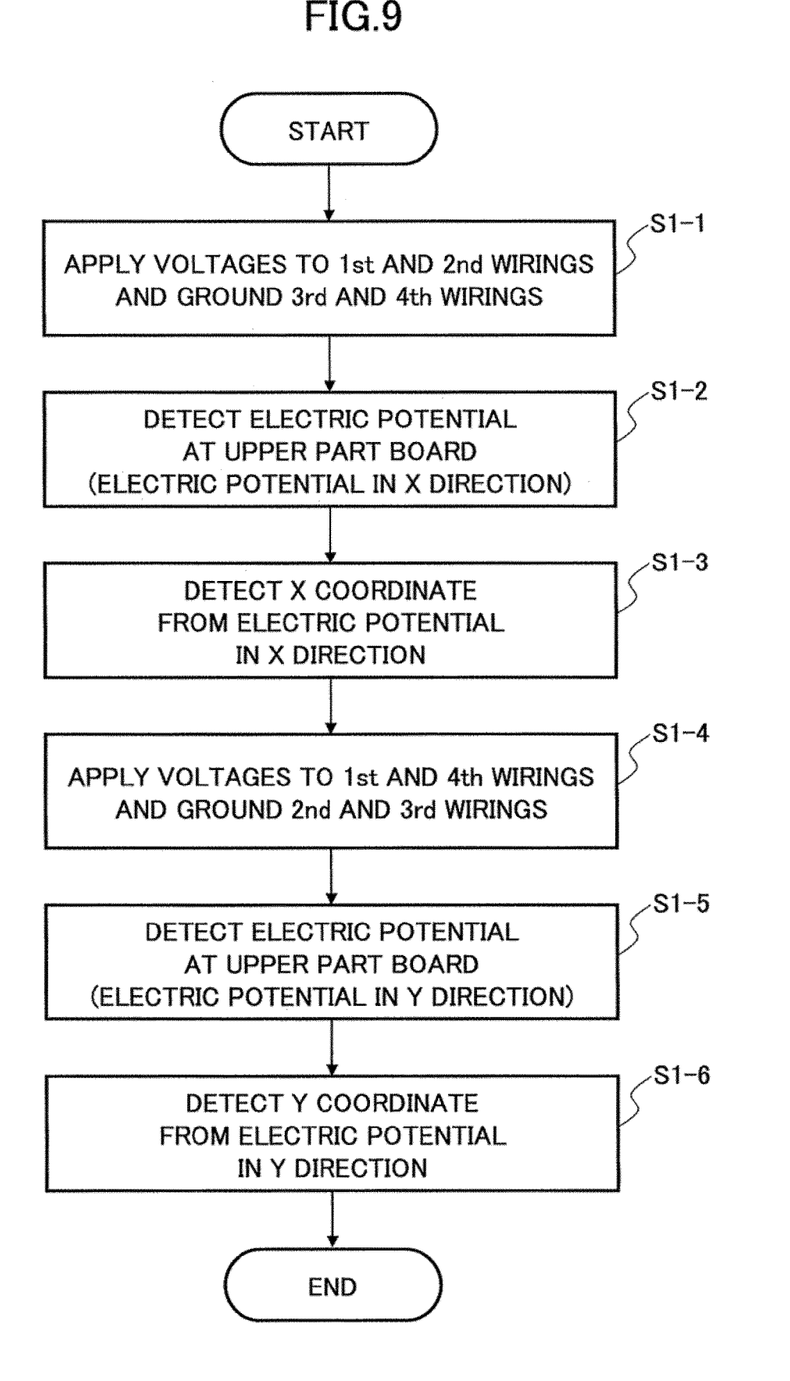
FIG. 9 is a process flow chart of an interface board.
Figure 10:
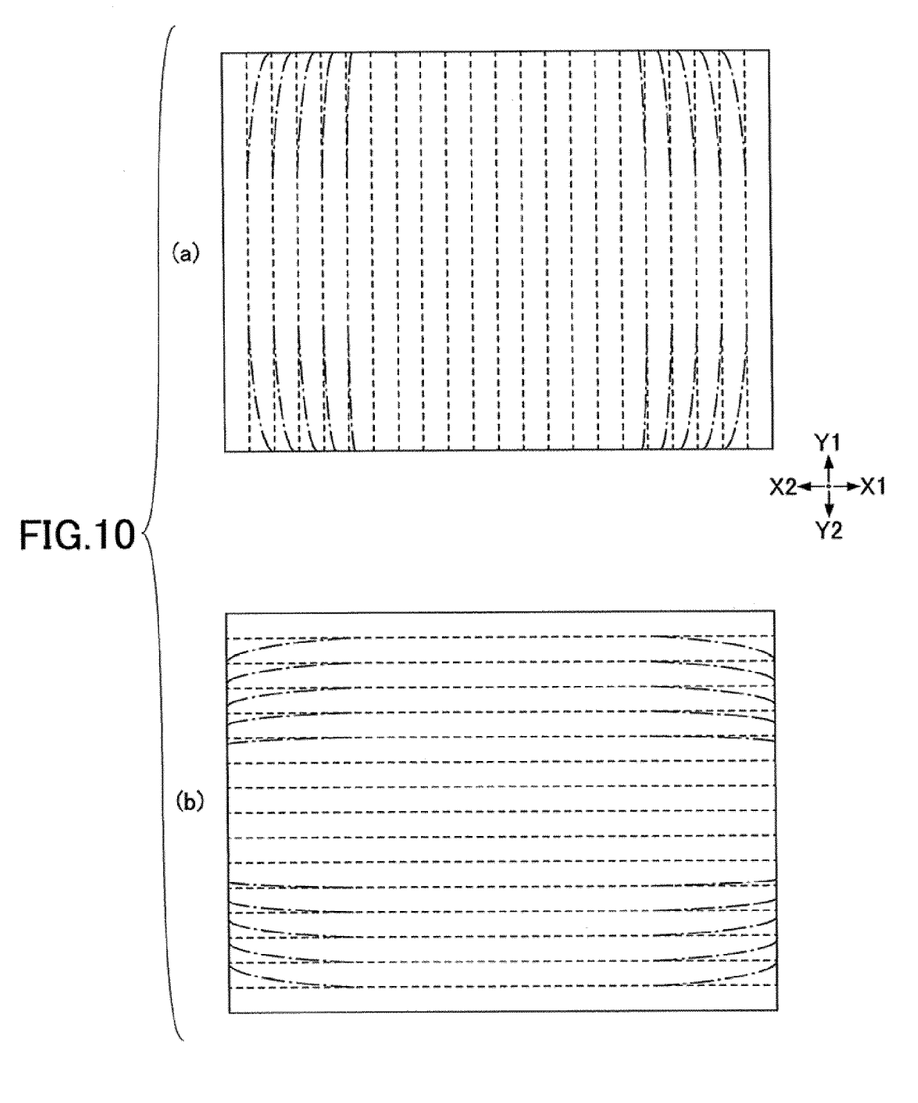
FIG. 10 is a view showing states of electric potential distribution of a lower part board.

FIG. 9 is a process flow chart of the interface board 112. FIG. 10 is a view showing states of the electric potential distribution of the lower part board 121. More specifically, FIG. 10(a) shows the electric potential distribution at an X coordinate detecting time. FIG. 10(b) shows the electric potential distribution at a Y coordinate detecting time.

The interface board 112 applies a voltage Vx to the first wiring 136-1 and the second wiring 136-2 and grounds the third wiring 136-3 and the fourth wiring 136-4 in step S1-1. As a result of this, it is possible to generate the uniform electric potential distribution shown by dotted lines in FIG. 10(a) on the transparent resistive film 132. An electric potential distribution of a conventional art case is deformed as shown by curved one-dotted chain lines in FIG. 10(a). Therefore, according to the embodiment of the present invention, it is possible to detect the X coordinate position securely.

Then, the interface board 112 detects the electric potential of the lower part board 121 in step 51-2. In addition, in step S1-3, the interface board 112 detects the X coordinate position corresponding to the electric potential of the lower part board 121.

Next, the interface board 112 applies a voltage Vy to the first wiring 136-1 and the fourth wiring 136-4 and grounds the second wiring 136-2 and the third wiring 136-3 in step S1-4. As a result of this, it is possible to generate the uniform electric potential distribution shown by a dotted line in FIG. 10(b) on the transparent resistive film 132. An electric potential distribution of a conventional art case is deformed as shown by curved one-dotted chain lines in FIG. 10(b). Therefore, according to the embodiment of the present invention, it is possible to detect the Y coordinate position securely.

Then, the interface board 112 detects the electric potential of the lower part board 121 in step S1-5. In addition, in step S1-4, the interface board 112 detects the Y coordinate position corresponding to the electric potential of the lower part board 121.

According to the embodiment of the present invention, the first wiring 136-1 through the fourth wiring 136-4 are stacked on the common electrode 134. Accordingly, it is possible to make the frame of the panel part 121 narrow. Furthermore, by forming the resistive film removing areas 133, it is possible to make the electric potential distribution applied to the transparent resistive film 132 of the lower part board 121 at the time of X coordinate position detecting time or at the time of Y coordinate position detecting time equal in the detecting area. Therefore, it is possible to perform the coordinate position detecting securely.

According to the above-discussed embodiments of the present invention, it is possible to provide a manufacturing method of a coordinate position detecting device, whereby a coordinate position detecting device having a narrow frame and improved detection precision of a coordinate position can be manufactured with high productivity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

For example, in the above-discussed embodiment of the present invention, ITO is used as a material of the transparent resistive film. As long as a material of the transparent resistive film includes indium oxide, tin oxide, zinc oxide, or antimony oxide and is transparent in a visible area, the same effect can be achieved.

What is claimed is:

1. A manufacturing method of a coordinate position detecting device, the coordinate position detecting device including a resistive film formed on a substrate having a rectangular-shaped configuration, and a common electrode configured to apply a voltage to the resistive film, wherein an electric potential distribution is generated on the resistive film by supplying an electric potential from the common electrode to the resistive film and detecting an electric potential of a position where the resistive film is contacted, so that a contact position coordinate of the resistive film is detected, the manufacturing method comprising:

forming the common electrode on the resistive film of four sides of the substrate;

measuring the electric potential of the resistive film by plural probes contacting a surface of the resistive film while supplying the electric potential from the common electrode to the resistive film;

calculating a resistive film removing area, based on a value of a measured electric potential, by a calculating part so that the electric potential distribution of the resistive film is made uniform; and removing the resistive film in the resistive film removing area calculated by the calculating part, by a laser light.

2. The manufacturing method of the coordinate position detecting device as claimed in claim 1, further comprising:

driving a moving table, to which the substrate is fixed, by a control circuit based on information of the calculated resistive film removing area, the moving table being configured to move at least in a two-dimensional direction, and irradiating the laser light to the fixed substrate while the moving table is driven.

3. The manufacturing method of the coordinate position detecting device as claimed in claim 1, wherein the resistive film includes ITO or indium oxide, tin oxide, zinc oxide, or antimony oxide.

4. The manufacturing method of the coordinate position detecting device as claimed in claim 1, wherein the substrate and the resistive film are transparent in a visible area.

5. The manufacturing method of the coordinate position detecting device as claimed in claim 1, wherein the laser light has a wavelength of 340 nm through 420 nm.

* * * * *